United States Patent [19]

Davis et al.

[11] 4,403,092

[45] Sep. 6, 1983

[54] POLYESTERS CONTAINING COPOLYMERIZED, ANTHRAQUINONE COLORANT COMPOUNDS CONTAINING SULFONAMIDO GROUPS

[75] Inventors: Thomas G. Davis; Max A. Weaver; Ralph R. Giles, all of Kingsport, Tenn.

[73] Assignee: Eastman Kodak Company, Rochester, N.Y.

[21] Appl. No.: 443,784

[22] Filed: Nov. 22, 1982

[51] Int. Cl.[3] .............................................. C08G 63/68

[52] U.S. Cl. .................................... 528/290; 525/437; 528/293; 528/294; 528/295; 528/304; 528/308.7

[58] Field of Search ............... 528/289, 290, 293, 294, 528/295, 304, 308.7; 525/437

[56] References Cited

U.S. PATENT DOCUMENTS

| | | | |
|---|---|---|---|
| 3,694,402 | 9/1972 | Essam | 523/205 X |
| 3,923,726 | 12/1975 | Benz | 523/205 X |
| 4,359,570 | 11/1982 | Davis et al. | 528/290 X |

*Primary Examiner*—Lucille M. Phynes

*Attorney, Agent, or Firm*—Donald W. Spurrell; Daniel B. Reece, III

[57] ABSTRACT

Disclosed are colored polyesters having copolymerized therein anthraquinone derivative colorants containing one or more sulfonamido groups. The colored polymers are fast to light and the colorant moieties are not extractable therefrom, rendering from the colored polymers particularly suitable for use in food containers such as molded beverage bottles. The inherent viscosities of these polymers can be varied widely as is well known in the art for different applications. The copolymerizable colorants have the formula

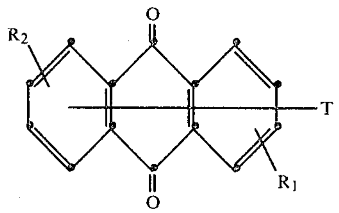

wherein $R_1$ and $R_2$ are each hydrogen or 1–3 substituents independently selected from alkyl, alkoxy, and the like; and T represents 1–4 independently selected radicals of the formula

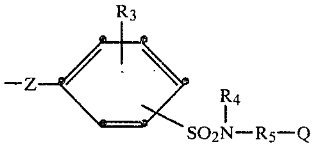

wherein $R_3$ is hydrogen or 1–3 substituents such as alkyl, alkoxy and the like; Z is a divalent linking group such as —NH—, —S—, —O—, and alkoxycarbonyl; and Q is hydroxy, carboxy or alkoxycarbonyl.

9 Claims, No Drawings

POLYESTERS CONTAINING COPOLYMERIZED, ANTHRAQUINONE COLORANT COMPOUNDS CONTAINING SULFONAMIDO GROUPS

DESCRIPTION

This invention relates to colored polyesters having copolymerized therein certain reactive anthraquinone derivative colorants containing one or more sulfonamido groups. The colored polymers are fast to light and the colorant moieties are not extractable from the polymer, giving the colored polymer particular suitability for use in food applications such as molded beverage bottles and the like.

The colorants of this invention have the following general formula:

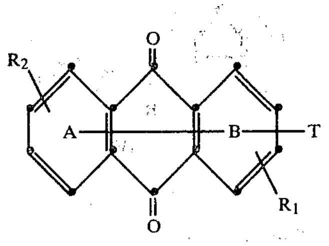

wherein $R_1$ and $R_2$ each represents hydrogen or 1-3 substituents depending on the number of T substituents present, and independently selected from alkyl, alkoxy, alkylamino, alkylsulfonyl, alkylsulfonylamino, alkanoylamino, aroylamino, alkylthio, arylamino, amino, cycloalkylamino, alkanoyl, aroyl, arylsulfonyl, $CF_3$, arylsulfamoyl, cyano, halogen, hydroxy, nitro, sulfamoyl, alkylsulfamoyl, dialkylsulfamoyl, carbamoyl, alkylcarbamoyl and dialkylcarbamoyl; and T is 1-4 independently selected substituents of the formula

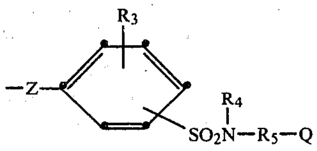

in any positions on rings A and/or B, wherein each Z is a divalent linking group independently selected from —NH—, —S—, —O—, —NHR—, —SR—, —SRS—, —SRO—, —SRSR—, —NHRO—, —NHRORO—, —NHRS—, —NHRSR—, —NHRN(COR)—, —NHRN($SO_2$R)—, —ORO—, —OR—, OROR—, —ORORO—, —ORSR—, and —ORN(COR)RO—, most preferably —NH—, wherein R is alkylene (alkanediyl), arylene or cycloalkylene;

$R_3$ represents hydrogen or 1-3 substituents independently selected from alkyl, alkoxy, cyano, alkanoylamino, halogen, and alkylthio; each $R_4$ is independently selected from hydrogen, alkyl, cycloalkyl, and aryl; each $R_5$ is independently selected from alkylene, arylene, cycloalkylene, arylenealkylene, aryleneoxyalkylene, arylenethioalkylene, alkylenethioalkylene, alkyleneoxyalkylene, arylenedialkylene, and cyclohexylenedialkylene; each Q represents 1-3 groups independently selected from hydroxy, carboxy, and —COO—(alkyl, aryl, or cycloalkyl);

and wherein the alkyl, alkylene, cycloalkyl, cycloalkylene, aryl, and arylene moieties or segments of the above $R_1$-$R_5$ groups, e.g. the alkylene segments of alkoxy groups, may be substituted with 1-3 of the following: hydroxy; halogen; cyano; amino; alkoxy; alkoxycarbonyl; aroyloxy; alkoxyalkoxy; hydroxyalkoxy; succinimido; glutarimido; phthalimido; phthalimidino; 2-pyrrolidono; cyclohexyl; phenoxy; phenyl; phenyl substituted with alkyl, alkoxy, alkoxycarbonyl, halogen, alkanoylamino or cyano; acrylamido; alkenyl; benzoylsulfonicimido; groups of the formula

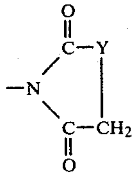

wherein Y is —NH—,

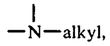

—O—, —S—, >CHOH, or —$CH_2$—O—; —S—$R^6$ wherein $R^6$ is selected from alkyl, alkyl substituted with 1-3 of halogen, hydroxy, phenoxy, aryl, cyano, cycloalkyl, alkylsulfonyl, alkylthio, alkanoyloxy, or alkoxy, phenyl, phenyl substituted with one or more of halogen, alkyl, alkoxy, alkanoylamino, cyano or alkoxycarbonyl, pyridyl, pyrimidinyl, 2-benzoxazolyl, 2-benzimidazolyl, 2-benzothiazolyl or

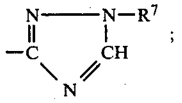

—$SO_2R^8$; —$COOR^8$; —$OXR^8$; —NH—X—$R^8$; —$CONR^7R^7$; —$SO_2NR^7R^7$; wherein X is —CO—, —COO—, or —$SO_2$; $R^8$ is selected from alkyl, aryl, cycloalkyl, and each of these groups substituted as appropriate with 1-3 substituents independently selected from halogen, hydroxy, phenoxy, aryl, alkyl, cyano, cycloalkyl, alkylsulfonyl, alkylthio, alkanoyloxy, and alkoxy, and when X is —CO—, $R^8$ is further selected from hydrogen, amino, alkenyl (e.g. —CH=$CH_2$), alkylamino, dialkylamino, arylamino and furyl; $R^7$ is selected from hydrogen, alkyl, aryl, alkoxysubstituted aryl, cycloalkyl, amino, alkylamino, dialkylamino, arylamino, furyl, and alkyl substituted with 1-3 of halogen, hydroxy, phenoxy, aryl, cyano, cycloalkyl, alkylsulfonyl, alkylthio, alkanoyloxy, or alkoxy; alkoxy substituted with 1-3 of hydroxy, cyano or alkanoyloxy; alkoxyalkoxy substituted with 1-3 of hydroxy, cyano, alkanoyloxy or alkoxy; and phenoxy substituted with 1-3 of alkyl, alkoxy or halogen. It is noted that when only one T is present, the colorant acts as a chain terminator.

Preferred for each of $R_1$ and $R_2$, in addition to H, are 1-3 substituents independently selected from halogen, —OH, —CN, —$NH_2$, —$NO_2$, alkyl, alkyl substituted with 1-3 of phenoxy, acetoxy, halogen, or alkoxy, benzoyl, alkoxy, hydroxyalkoxy, alkanoyl, carbamoyl, alkylcarbamoyl, dialkylcarbamoyl, phenylsulfonyl, alkylsulfonyl, hydroxyalkylsulfonyl, sulfamoyl, alkylsulfamoyl, dialkylsulfamoyl, hydroxyalkylsulfamoyl, alkylthio, hydroxyalkylthio, aralkylamino, alkylamino, cyclohexylamino, acetamido, phenylsulfonamido, and alkylsulfonamido. Preferred for $R_3$, in addition to H, are 1–3 substituents independently selected from alkyl, alkoxy, haloalkyl, halogen, alkylthio, —CN, and alkanolyamino. Preferred for $R_4$, in addition to H, are alkyl, phenyl, cyclohexyl, hydroxyalkyl, and benzyl. Preferred for $R_5$ is a group selected from alkylene, phenyl substituted alkylene, alkyleneoxyalkylene, alkylenethioalkylene, alkylenearylene, alkylenecyclohexylene, alkylenecyclohexylenealkylene, alkyleneoxyarylene, alkyleneoxycarbonylarylene, alkylenethioarylene, arylene, and cyclohexylene, wherein the rings are unsubstituted or substituted with 1–3 groups independently selected from halogen, alkyl, and alkoxy.

Regarding the above $R_1$ through $R_5$ groups, preferred substituents for substitution on the alkyl and alkylene moieties thereof are 1–3 of phenyl, phenoxy, hydroxy, alkanoyloxy, F, Cl, Br, I, or alkoxy; for substitution on the cycloalkyl and cycloalkylene moieties thereof are 1–3 of alkyl or hydroxy; and for substitution on the aryl and arylene moieties thereof are 1–3 of alkyl, F, Cl, Br, I, alkoxy or hydroxy.

Each of the above alkyl, alkylene, and such moieties of the alkoxy, alkanoyl, and other groups defined above contain 1–6 carbons; the aryl moieties contain from 6–10 carbons; and the cycloalkyl moieties contain from 5–8 carbons.

Polymers of almost any color can be obtained by the combination of the yellow, red, and blue colorants disclosed above, which polymers are useful, for example, in molded articles and in blown bottles. The colorants have excellent heat stability, do not decompose or sublime under polymerization conditions of high temperature, and are not extractable from the polymers.

The colorants are generally prepared as shown below by converting intermediates of structure I into their sulfonyl chloride derivatives II followed by reaction with III to give IV.

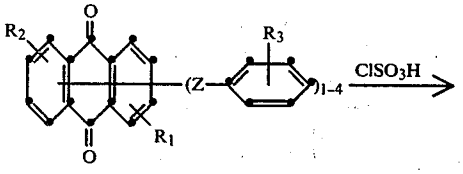

I

-continued

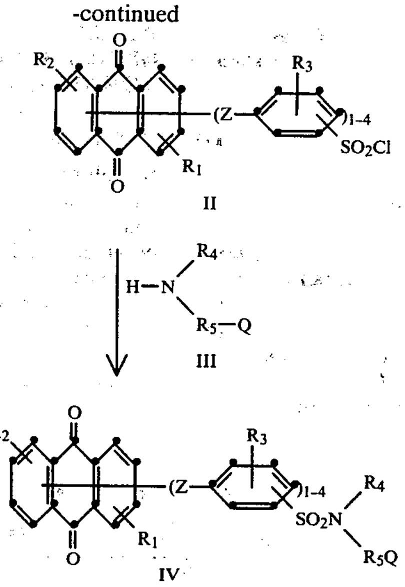

II

III

IV

Intermediates I are widely disclosed in the disperse dye art and usually are prepared, for example, by reacting anthraquinone compounds containing replaceable groups such as halogen with anilines, phenols, and thiophenols. Such anthraquinone compounds typically carry substituents such as 1-chloro, 2-chloro, 1,5-dichloro, 1,8-dichloro, 1,4-dichloro, 2,6-dichloro, 1-bromo-2-methyl, 1-bromo-2-methoxy, 1-bromo-4-methylamino, 1-amino-4-bromo-2-methoxy, 1-amino-4-anilino-2-bromo, 1-amino-4-bromo-2-methyl sulfonyl, 1,5-diamino-4,8-dichloro, 4,5-diamino-1,8-dihydroxy-2,6-dibromo, 1,4,5,8-tetrachloro, 1,4-diamino-5,8-dichloro-, 1,4-diamino-6-chloro, 1-amino-2,4-dibromo, 1-amino-4-bromo-2-chloro, 1-bromo-4-cyclohexylamino, 1-bromo-4-phenylethylamino, 2,6-dibromo-1,4,5,8-tetraamino, 1-amino-4-bromo-2-methylthio, and 1,4-diamino-2,3-dichloro.

Certain anthraquinones containing hydroxy or nitro groups can be reacted with aromatic amines to produce intermediates useful in this invention. Such reactants include quinizarin, 6-chloroquinizarin, 6-methylquinizarin, 1,4,5,8-tetrahydroxyanthraquinone, 1-nitroanthraquinone, 2-nitroanthraquinone, 1,5-dinitroanthraquinone, and 1,8-dihydroxy-4,5-dinitroanthraquinone.

Intermediates I can usually be chlorosulfonated directly by treating with chlorosulfonic acid to produce sulfonyl chlorides II, which are then reacted with amines III to produce the desired colorants. Typical of compounds III are 2-aminoethanol, 2,2'-iminodiethanol, 1-amino-2,3-propanediol, methylanthranilate, methyl-m-aminobenzoate, p-aminobenzoic acid, m-aminophenol, 6-aminohexanoic acid, β-alanine, glycine ethyl ester, p-aminophenoxyethanol, 2-methylaminoethanol, and 2-anilinoethanol.

Another useful route to compounds IV includes the reaction of anthraquinone having reactive halogen, hydroxy, or nitro substituents with intermediates of the structure

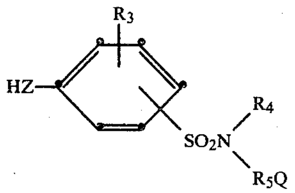

but the previously discussed route is generally of more utility.

The following examples will further illustrate the invention.

EXAMPLE 1

Preparation of 1,5-di(o-anisidino)anthraquinone-A mixture of 1,5-dichloroanthraquinone (55.4 g, 0.20 m), o-anisidine (205 g, 1.67 m), potassium acetate (49.0 g, 0.50 m), and copper bronze (1 g) was heated at 150°-155° C. for 3 hours. The reaction mixture was cooled, isopropanol (100 ml) added to facilitate stirring, and the mixture drowned into 200 ml of water containing 140 ml of concentrated HCl. The precipitate was isolated by filtration, washed with water and then with methanol. Purification was accomplished by heating the solid (still moist with methanol) in methyl cellosolve, allowing the mixture to cool, collecting the solid by filtration, and washing with methanol. After drying, the crystalline solid weighed 81.6 g (90.6% of the theoretical yield).

EXAMPLE 2

Chlorosulfonation of 1,5-Di-(o-anisidino)anthraquinone-To chlorosulfonic acid (225 g) was added 1,5-di-(o-anisidino)anthraquinone (22.5 g) with stirring and below 35° C. After being heated at 40°-45° C. for 1 hour, the reaction mixture was added gradually to 1000 g of ice in 500 g of 20% NaCl siolution with stirring. The precipitate product of 1,5-di(2-methoxy-5-chlorosulfonylanilino)anthraquinone was collected by filtration, washed with ice water, and left for further immediate reaction with amine.

EXAMPLES 3-7

Reaction of sulfonyl chloride with amines-The water-wet product of Example 2 was divided in five equal portions by weight and added to solutions of the following amines in 40 ml of pyridine each.

Example 3- m-Aminophenol (4.4 g, 0.04 m)
Example 4-p-Aminophenol (4.4 g, 0.04 m)
Example 5-p-Aminophenylethanol (5.5 g, 0.04 m)
Example 6-Methyl-m-aminobenzoate (6.0 g, 0.04 m)
Example 7-2-Aminoethanol (2.6 g, 0.04 m)

The colorants were precipitated by drowning into 200 ml of water containing 25 ml of acetic acid. After collecting by filtration, the dark red solids were washed well with water and dried at 60° C. These solids were used without further purification as copolymerizable colorants in polyesters. The invention is further illustrated by the examples of Tables I-IV showing representative colorants.

TABLE I

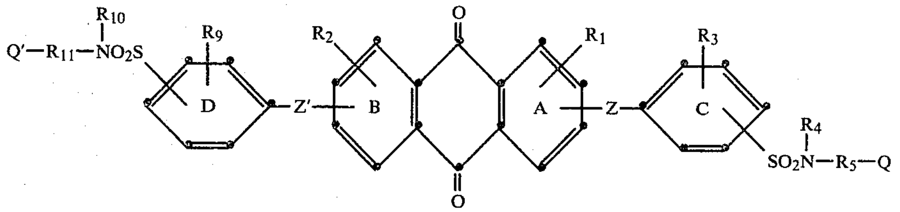

| Ex. | —$SO_2$— Position Ring C | D | Z on Ring A | Z' on Ring B | $R_3$ | $R_4$ | $R_5$—Q | $R_1$ |
|---|---|---|---|---|---|---|---|---|
| 8 | 3 | 3 | 1-NH— | 5-NH— | H | H | —$CH_2CH_2OH$ | H |
| 9 | 3 | 3 | " | 8-NH— | 2-$CH_2I$ | H | —$CH_2CH_2CH_2OH$ | " |
| 10 | 3 | 3 | " | 5-NH— | 4-$OCH_3$ | H | —$CH_2CH_2COOH$ | " |
| 11 | 3 | 3 | 1-S— | " | 2-Cl | —$CH_3$ | —$CH_2CH_2COOC_6H_5$ | 4-$CONHC_2H_5$ |
| 12 | 3 | 3 | 1-$NHCH_2N(SO_2CH_3)$— | " | 4-$SCH_3$ | —$C_6H_5$ | —$CH_2CH_2COOC_6H_{11}$ | H |
| 13 | 3 | 3 | 1-NH— | 5-S— | 4-$CH_3$ | H | 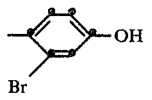 | 4-F |
| 14 | 3 | 3 | " | " | 4-t-butyl | " | 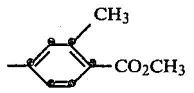 | 4-Cl |
| 15 | 4 | 4 | 2-NH— | 6-NH— | 2,5-di-$CH_3$ | —$C_6H_{11}$ | —$CH_2CH_2OCH_2CH_2OH$ | 1-$CH_3$ |
| 16 | 4 | 4 | 1-NH— | 5-NH— | 2,5-di-$OCH_3$ | —$CH_2CH_2OH$ | —$CH_2CH_2OH$ | H |
| 17 | 4 | 5 | " | " | 2-$OCH_3$ | H | $CH_2CH(OH)CH_2OH$ | 2-$CH_2OC_6H_5$ |
| 18 | 3 | 3 | 1-$NHCH_2CH_2$— | 5-$NHCH_2CH_2$— | 2-F | H | 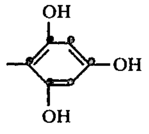 | |

TABLE I-continued

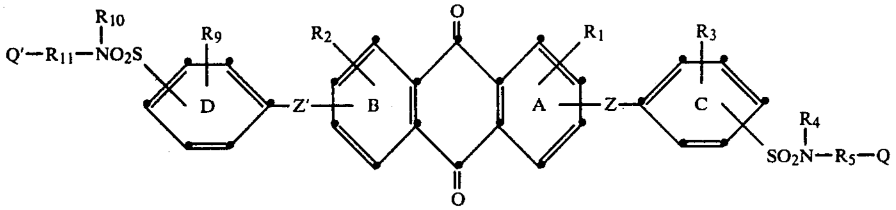

| | | | | | | | | |
|---|---|---|---|---|---|---|---|---|
| 19 | 3 | 3 | 1-$SCH_2CH_2$— | 5-$SCH_2CH_2$— | H | H | 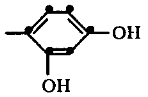 | 4-$NHCH_2C_6H_5$ |
| 20 | 3 | 3 | 1-$NHCH_2CH_2O$— | 5-$NHCH_2CH_2O$— | 4-$CH_3$ | $C_2H_5$ | $CH_2CH_2OH$ | H |
| 21 | 2 | 2 | 1-NH$(CH_2CH_2O)_2$ | 5-$(NHCH_2CH_2O)_2$ | H | H | $CH_2CH_2CH_2OH$ | " |
| 22 | 3 | 3 | 1-$NHCH_2CH_2S$— | 5-$NHCH_2CH_2S$— | H | $CH_2C_6H_5$ | $CH_2CH_2OH$ | " |
| 23 | 5 | 5 | 1-$NHCH_2CH_2S$—$CH_2$— | 5-$NHCH_2CH_2SCH_2$— | 2-$OCH_3$ | $CH_2CH_2OH$ | " | |
| 24 | 4 | 4 | 1-$SCH_2CH_2O$— | 5-$SCH_2CH_2O$— | 3-Br | $C_4H_9$-n | 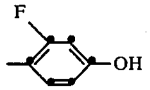 | " |
| 25 | 3 | 3 | 1-$NHCH_2$— | 5-$NHCH_2$— | 2-CH | H | 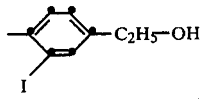 | " |
| 26 | 5 | 5 | 2-NH— | 6-NH— | 2-$OCH_3$ | H | —$CH_2CH(OH)CH_3$ | " |
| 27 | 5 | 5 | " | " | " | " | 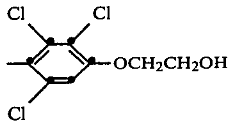 | 1-$NH_2$—4-OH |
| 28 | 5 | 5 | " | " | 2-$NHCOCH_3$ | " | 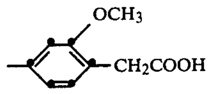 | " |
| 29 | 5 | 5 | " | " | " | " | 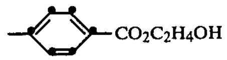 | 1-$CH_2OCOCH_3$ |
| 30 | 5 | 5 | " | " | 2-I | " | —$(CH_2)_5COOH$ | 1-$CH_2CH_2Cl$ |
| 31 | 3 | 5 | 1-NH— | 8-NH— | 4-$OCH_3$ | " | —$CH_2OH(OH)C_6H_5$ | 4-$CF_3$ |
| 32 | 3 | 3 | " | " | " | " | 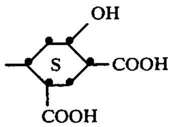 | 4-$CH_2Br$ |
| 33 | 3 | 3 | " | " | " | " | 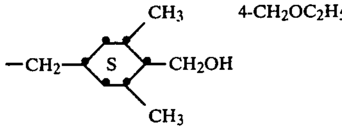 | 4-$CH_2OC_2H_5$ |
| 34 | 3 | 3 | " | " | " | $C_6H_5$ | $CH_2CH_2COOH$ | H |
| 35 | 3 | 3 | " | " | " | " | 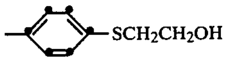 | " |
| 36 | 3 | 3 | " | " | " | " | 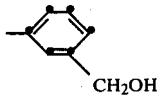 | " |
| 37 | 5 | 5 | " | " | 2-$OCH_3$ | " | $CH_2CH_2OH$ | 3-Br-4-$NH_2$ |

TABLE I-continued

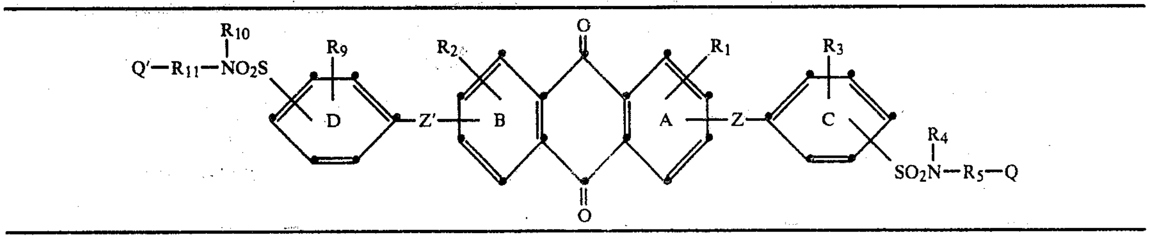

| Ex. | C | D | Z on Ring A | Z' on Ring B | | | | |
|---|---|---|---|---|---|---|---|---|
| 38 | 5 | 5 | " | " | " | " | " | 4-$NHCH_3$ |
| 39 | 5 | 5 | " | " | " | " | " | 4-OH |
| 40 | 5 | 5 | " | " | " | " | " | 4-$OCH_3$ |
| 41 | 5 | 5 | " | 5-NH— | " | " | " | 4-$NHC_6H_{11}$ |
| 42 | 5 | 5 | " | " | " | " | 4-$NH_2$ | |
| 43 | 5 | 5 | 2-NH— | " | " | " | " | 1-$NHSO_2CH_3$ |
| 44 | 5 | 5 | " | " | " | " | " | 1-$NHCOCH_3$ |
| 45 | 5 | 5 | " | " | " | " | 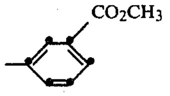 | H |
| 46 | 5 | 5 | " | " | " | " | 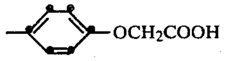 | H |
| 47 | 5 | 5 | " | " | " | " | 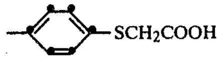 | H |
| 48 | 5 | 5 | " | " | " | " | $-CH_2CH_2SCH_2CH_2OH$ | H |
| 49 | 5 | 5 | " | " | " | " | 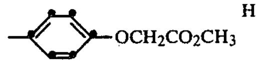 | H |
| 50 | 5 | 5 | " | " | " | " | 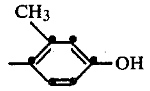 | H |
| 51 | 5 | 5 | " | " | " | " | 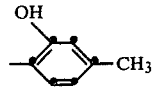 | H |
| 52 | 5 | 5 | " | " | " | " | 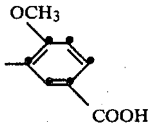 | H |
| 53 | 5 | 5 | " | " | " | " | 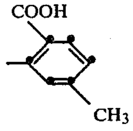 | H |
| 54 | 5 | 5 | 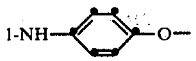 | 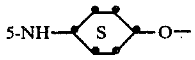 | " | " | " | H |
| 55 | 5 | 5 |  | " | " | " | " | H |

| Ex. | $-SO_2-$ Position C | D | Z on Ring A | Z' on Ring B | $R_2$ | $R_9$ | $R_{10}$ | $R_{11}-Q'$ |
|---|---|---|---|---|---|---|---|---|
| 8 | 3 | 3 | 1-NH— | 5-NH— | H | 2-$CH_3$ | H | $-CH_2CH_2CH_2OH$ |
| 9 | 3 | 5 | " | 8-NH— | " | 4-$OCH_3$ | H | $-CH_2CH_2COOH$ |
| 10 | 5 | 5 | " | 5-NH— | " | 2-Cl | $-CH_3$ | $-CH_2CH_2OH$ |
| 11 | 3 | 5 | 1-A— | " | " | 4-$SCH_3$ | $-C_6H_5$ | $-CH_2CH_2OH$ |

TABLE I-continued

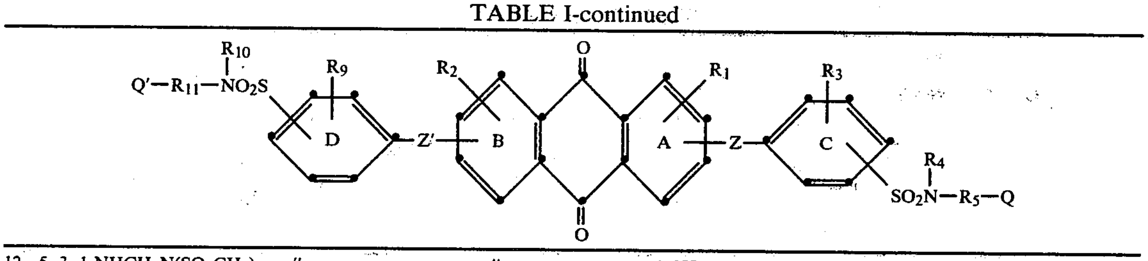

| | | | | | | | | |
|---|---|---|---|---|---|---|---|---|
| 12 | 5 | 3 | 1-$NHCH_2N(SO_2CH_3)$— | " | " | 4-$CH_3$ | H | 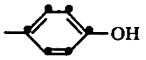 |
| 13 | 3 | 3 | 1-NH— | 5-S— | 8-F | 4-t-butyl | " |  |
| 14 | 3 | 3 | " | " | " | 2,5-di-$CH_3$ | —$C_6H_{11}$ | —$CH_2CH_2OCH_2CH_2OH$ |
| 15 | 4 | 4 | 2-NH— | 6-NH— | " | 2,5-di-$OCH_3$ | —$CH_2CH_2OH$ | —$CH_2CH_2OH$ |
| 16 | 4 | 4 | 1-NH— | 5-NH— | " | 2-$OCH_3$ | H | —$CH_2CH(OH)CH_2OH$ |
| 17 | 4 | 4 | " | " | " | H | H | 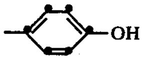 |
| 18 | 3 | 3 | 1-$NHCH_2CH_2$— | 5-$NHCH_2CH_2$— | " | H | H | —$CH_2CH_2OH$ |
| 19 | 3 | 3 | 1-$SCH_2CH_2$ | 5-$SCH_2CH_2$— | " | 4-$CH_3$ | —$C_2H_5$ | $CH_2CH_2OH$ |
| 20 | 3 | 3 | 1-$NHCH_2CH_2O$— | 5-$NHCH_2CH_2O$— | 8-$COC_6H_5$ | H | H | $CH_2CH_2CH_2OH$ |
| 21 | 2 | 2 | 1-$NH(CH_2CH_2O)_2$— | 5-$(NHCH_2CH_2O)_2$— | 8-$SO_2NH_2$ | H | $CH_2CH_6H_5$ | $CH_2CH_2OH$ |
| 22 | 3 | 3 | 1-$NHCH_2CH_2S$— | 5-$NHCH_2CH_2S$— | 8-$SO_2N(C_2H_5)_2$ | 2-$OCH_3$ | $C_6H_{11}$ | $CH_2CH_2OH$ |
| 23 | 5 | 5 | 1-$NHCH_2CH_2S$—$CH_2$— | 5-$NHCH_2CH_2SCH_2$— | 8-$CONH_2$ | 2-Br | $C_4H_6$—n | 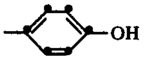 |
| 24 | 4 | 4 | 1-$SCH_2CH_2O$— | 5-$SCH_2CH_2O$— | 8-$CONHC_2H_5$ | H | H | 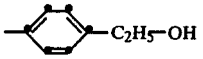 |
| 25 | 3 | 3 | 1-$NHCH_2$— | 5-$NHCH_2$— | 8-$CONH(C_2H_5)_2$ | 2-$OCH_3$ | H | —$CH_2CH(OH)CH_3$ |
| 26 | 5 | 5 | 2-NH— | 6-NH— | H | " | " | 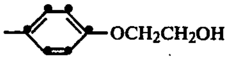 |
| 27 | 5 | 5 | " | " | 5-$NH_2$-8-OH | " | " | 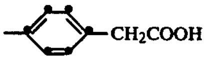 |
| 28 | 5 | 5 | " | " | " | " | " | 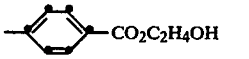 |
| 29 | 5 | 5 | " | " | " | " | " | —$(CH_2)_5COOH$ |
| 30 | 5 | 5 | " | " | " | 4-$OCH_3$ | " | —$CH_2CH(OH)C_6H_5$ |
| 31 | 3 | 3 | 1-NH— | 8-NH— | H | " | " | 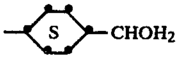 |
| 32 | 3 | 3 | " | " | " | " | " | 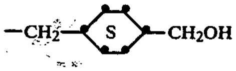 |
| 33 | 3 | 3 | " | " | " | " | $C_6H_5$ | $CH_2CH_2COOH$ |
| 34 | 3 | 3 | " | " | " | H | H | 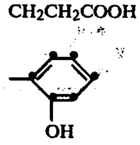 |
| 35 | 3 | 3 | " | " | " | " | " | 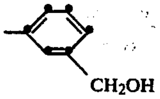 |
| 36 | 3 | " | | " | " | 2-$OCH_2$ | " | $CH_2CH_2OH$ |

TABLE I-continued
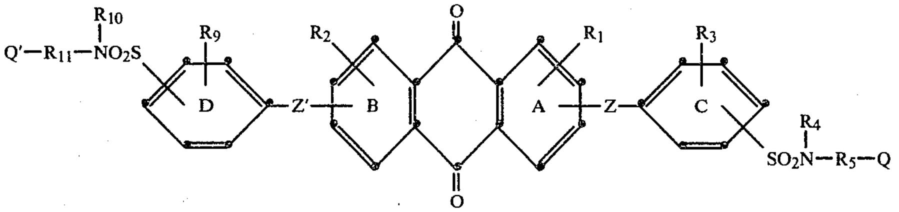
| | | | | | | | | |
|---|---|---|---|---|---|---|---|---|
| 37 | 5 | 5 | " | " | 5-NH2-6-Br | " | " | " |
| 38 | 5 | 5 | " | " | 5-NHCH2 | " | " | " |
| 39 | 5 | 5 | " | " | 5-OH | " | " | " |
| 40 | 5 | 5 | " | " | 5-OCH3 | " | " | " |
| 41 | 5 | 5 | " | 5-NH— | 5-NHC6H11 | " | " | " |
| 42 | 5 | 5 | " | " | 8-NH2 | " | " | " |
| 43 | 5 | 5 | 2-NH— | " | 8-NHSO2CH3 | " | " | " |
| 44 | 5 | 5 | " | " | 8-NHCOCH3 | " | " | 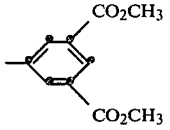 |
| 45 | 5 | 5 | " | " | H | " | " | 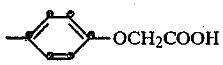 |
| 46 | 5 | 5 | " | " | H | " | " | 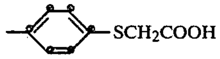 |
| 47 | 5 | 5 | " | " | H | " | " | —CH2CH2SCH2CH2OH |
| 48 | 5 | 5 | " | " | H | " | " | 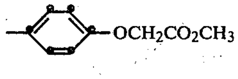 |
| 49 | 5 | 5 | " | " | H | " | " | 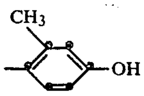 |
| 50 | 5 | 5 | " | " | H | " | " | 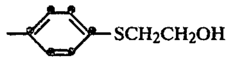 |
| 51 | 5 | 5 | " | " | H | " | " | 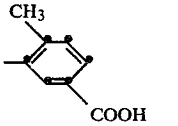 |
| 52 | 5 | 5 | " | " | H | " | " | 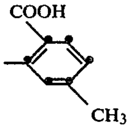 |
| 53 | 5 | 5 | " | " | H | " | " | " |
| 54 | 5 | 5 | 1-NH— 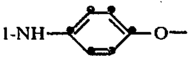 —O— | 5-NH—  —O— | H | " | " | " |
| 55 | 5 | 5 | 1-S—  —O— | " | " | " | " | 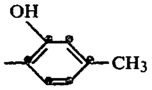 |

TABLE II

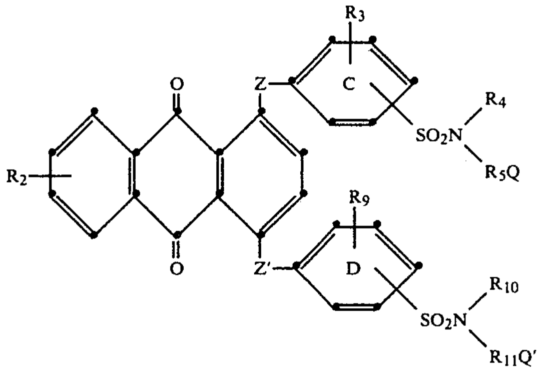

| Ex. | —SO$_2$— Position Ring C | Ring D | Z | Z' | $R_3$ | $R_4$ | $R_5Q$ | $R_2$ | $R_9$ | $R_{10}$ | $R_{11}$—Q' |
|---|---|---|---|---|---|---|---|---|---|---|---|
| 56 | 5 | 5 | —NH— | —NH— | 2-$OCH_3$ | H | —$CH_2CH_2OH$ | H | 2-$CH_3$ | H | —$CH_2CH_2CH_2OH$ |
| 57 | 3 | 5 | —S— | —S— | 4-t-butyl | H | " | H | 4-$OCH_3$ | H | —$CH_2CH_2COOH$ |
| 58 | 3 | 5 | —O— | —O— | 4-$OCH_3$ | $CH_3$ | —$CH_2CH_2CH_2OH$ | H | 2-Cl | —$CH_3$ | —$CH_2CH_2OH$ |
| 59 | 3 | 3 | —NH— | —NH— | 2,5-di-$CH_3$ | H | 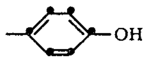 | H | 4-$SCH_3$ | —$C_6H_5$ | —$CH_2CH_2OH$ |
| 60 | 3 | 3 | " | —O— | 2,6-di-$C_2H_5$ | H | —$CH_2CH_2OH$ | H | 4-$CH_3$ | H | 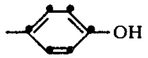 |
| 61 | 3 | 5 | " | —S— | 2,6-di-$C_2H_5$ | $CH_2CH_2OH$ | —$CH_2CH_2OH$ | H | 4-t-butyl | " | 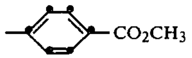 |
| 62 | 3 | 3 | " | " | 4-$CH_3$ | $C_6H_{11}$ | —$CH_2CH_2CH_2CH_2OH$ | 6-Cl | 2,5-di-$CH_3$ | —$C_6H_{11}$ | —$CH_2CH_2OCH_2CH_2OH$ |
| 63 | 3 | 3 | " | " | 2,4,6-tri-$CH_3$ | H | —$CH_2CH_2CO_2CH_3$ | 6-$CH_3$ | 2,5-di-$OCH_3$ | —$CH_2CH_2OH$ | $CH_2CH_2OH$ |
| 64 | 3 | 3 | " | —NH— | H | H | 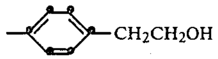 | 5,8-di-OH | 2-$OCH_3$ | H | $CH_2CH(OH)CH_2OH$ |
| 65 | 5 | 3 | " | " | 2-Cl | H | 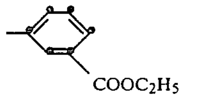 | H | H | H | 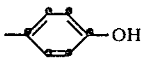 |

TABLE II-continued
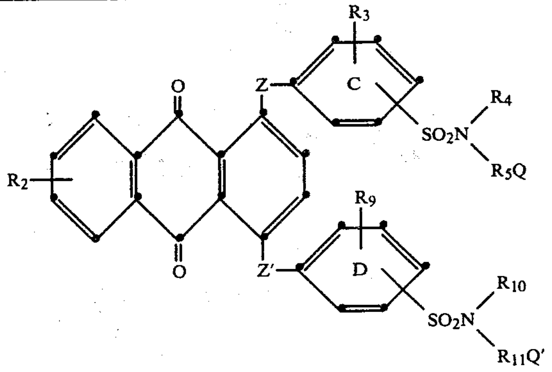
| Ex. | —SO2— Position Ring C | Ring D | Z | Z' | $R_3$ | $R_4$ | $R_5Q$ | $R_2$ | $R_9$ | $R_{10}$ | $R_{11}$—Q' |
|---|---|---|---|---|---|---|---|---|---|---|---|
| 66 | 5 | 3 | " | " | 2-Br | H | 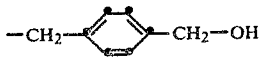 | H | H | H | $-CH_2CH_2OH$ |
| 67 | 5 | 5 | " | " | 2-I | H | 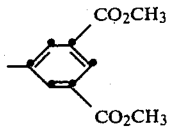 | H | 4-$CH_3$ | $C_2H_5$ | $CH_2CH_2OH$ |
| 68 | 5 | 5 | $-NHCH_2-$ | $-NHCH_2-$ | 2-$OCH_3$ | H | 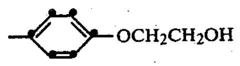 | H | H | H | $CH_2CH_2CH_2OH$ |
| 69 | 5 | 5 | $-NHCH_2CH_2-$ | —O— | " | $C_6H_5$ | $-CH_2CH_2OH$ | H | H | $CH_2C_6H_5$ | $CH_2CH_2OH$ |
| 70 | 5 | 5 | $-NHCH_2CH_2O-$ | —S— | " | H | $-CH_2CO_2CH_3$ | H | 2-$OCH_3$ | $C_6H_{11}$ | $CH_2CH_2OH$ |

TABLE III

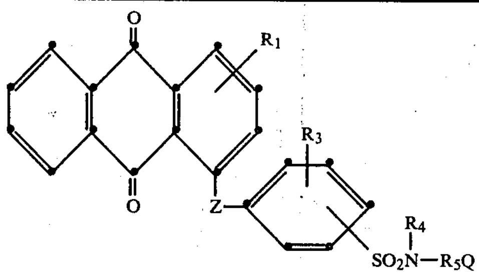

| Ex. | $-SO_2-$ Position | $R_1$ | Z | $R_3$ | $R_4$ | $R_5Q$ |
|---|---|---|---|---|---|---|
| 71 | 2 | 1-$NH_2$ | —S— | 4-$CH_3$ | H | $-CH_2CH_2OH$ |
| 72 | 3 | 1-$NH_2$—2-Br | —S— | 4-t-butyl | $CH_2CH_2OH$ | $-CH_2CH_2OH$ |
| 73 | 5 | 1-$NH_2$—2-S— 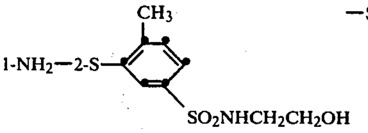 | —S— | 2-$CH_3$ | H | $-CH_2CH_2OH$ |
| 74 | 5 | 1-$NH_2$—2-$COCH_3$ | —NH— | 2-$OCH_3$ | H | $-CH_2CH_2CO_2CH_3$ |
| 75 | 5 | 1-$NH_2$—2-$OCH_3$ | —NH— | " | " | 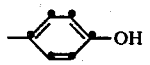 |
| 76 | 5 | 1-$NH_2$—2-$CH_3$ | " | " | " | 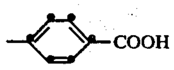 |
| 77 | 3 | 1-$NH_2$—2-$CF_3$ | " | 4-$OCH_3$ | " | 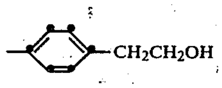 |
| 78 | 3 | 1-$NH_2$—2-$SO_2CH_3$ | " | 4-$CH_3$ | " | 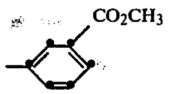 |
| 79 | 5 | 1-$NH_2$—2-CN | " | 2-$OCH_3$ | $CH_2CH_2OH$ | $-CH_2CH_2OH$ |
| 80 | 5 | 1-$NH_2$—2-$SO_2NHC_2H_5$ | " | " | $C_6H_5$ | " |
| 81 | 5 | 1-$NH_2$—2-$SO_2NHC_2H_4OH$ | " | " | $C_6H_{11}$ | " |
| 82 | 5 | 1-$NH_2$—2-$NO_2$ | " | " | H | $-CH_2CH(OH)CH_2OH$ |
| 83 | 5 | 1-$NH_2$—2-$SO_2C_6H_5$ | " | " | H | 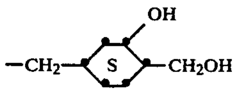 |
| 84 | 5 | H | " | 2-$CH_3$ | H | $-CH_2CH_2OH$ |
| 85 | 5 | 1-OH | " | 2-Cl | H | $-CH_2CH_2OCH_2CH_2OH$ |
| 86 | 4 | " | $-NHCH_2-$ | H | H | $-CH_2COOH$ |
| 87 | 3 | " | $-NHCH_2CH_2O-$ | H | H | $-CH_2CH(OH)CH_3$ |
| 88 | 3 | 1-$NH_2$—2-$SO_2CH_2CH_2OH$ | —NH— | " | " | 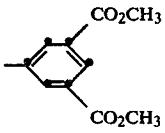 |
| 89 | 2 | 1-$NHCH_3$—2-Br | " | 4-$OCH_3$ | " | 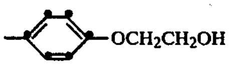 |
| 90 | 5 | 1-$NHC_6H_{11}$ | " | 3-Br | " | 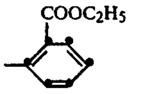 |

TABLE III-continued

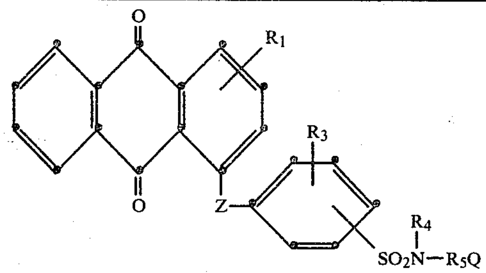

| Ex. | $-SO_2-$ Position | $R_1$ | Z | $R_3$ | $R_4$ | $R_5Q$ |
|---|---|---|---|---|---|---|
| 91 | 3 | 1-$NHCOCH_3$ | " | 2,5-di-$CH_3$ | " | 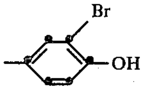 |
| 92 | 5 | 1-$NH_2$—2-$OCH_2CH_2OH$ | " | 2-$OCH_3$ | " | $-CH_2CH_2OH$ |

TABLE IV

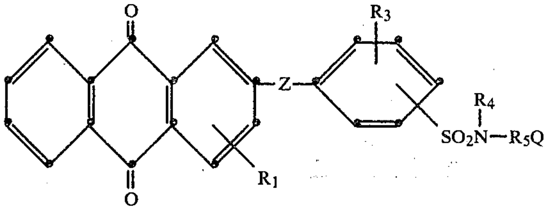

| Ex. | $-SO_2-$ Position | $R_1$ | Z | $R_3$ | $R_4$ | $R_5Q$ |
|---|---|---|---|---|---|---|
| 93 | 3 | 1,4-di-OH | $-NHCH_2CH_2O-$ | H | H | $CH_2CH_2OH$ |
| 94 | 5 | " | $-OCH_2CH_2O-$ | 2-$CH_3$ | $CH_2CH_2OH$ | " |
| 95 | 5 | " | $-NHCH_2CH_2N(COCH_3)-$ | 2-$OCH_3$ | $CH_3$ | " |
| 96 | 5 | " | $-NHCH_2CH_2N(SO_2CH_3)-$ | " | $C_6H_5$ | " |
| 97 | 5 | " | $-SCH_2CH_2S-$ | 2-Cl | H | $CH_2CH(OH)CH_2OH$ |
| 98 | 3 | 1-$NH_2$—4-OH | $-OCH_2CH_2O-$ | H | " | $CH_2CH_2CH_2OH$ |
| 99 | 3 | " | —O— | 2,6-di-$CH_3$ | " | 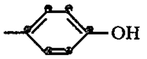 |
| 100 | 3 | " | —S— | 4-$CH_3$ | " | $CH_2CH_2CO_2CH_3$ |
| 101 | 3 | 1-$NH_2$—4-$NH_2$ | —O— | H | " | 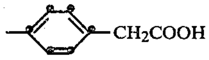 |
| 102 | 3 | 1-$NH_2$—4-$NHSO_2CH_3$ | " | " | " | 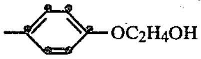 |
| 103 | 3 | 1-$NH_2$—4-$NHSO_2C_6H_5$ | " | " | " | 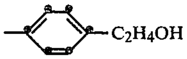 |
| 104 | 3 | 1-$NHCH_3$—4-$NHCOCH_3$ | " | " | " | 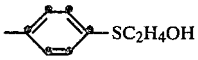 |
| 105 | 3 | 1-$NHC_6H_{11}$—4-OH | " | " | " | 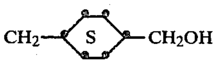 |
| 106 | 3 | 1-$NH_2$—4-OH | $-OCH_2-$ | 4-Br | " | $(CH_2)_6OH$ |
| 107 | 5 | " | $-OCH_2CH_2OCH_2CH_2-$ | 2,4-di-Cl | $C_4H_9$—n | $CH_2CH(OH)CH_3$ |
| 108 | 4 | " | $-OCH_2CH_2OCH_2CH_2O-$ | 2-$OCH_3$—5-$CH_3$ | $CH_2C_6H_5$ | $CH_2CH_2OH$ |
| 109 | 4 | " | $-OCH_2CH_2SCH_2CH_2-$ | " | H | 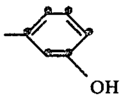 |

TABLE IV-continued

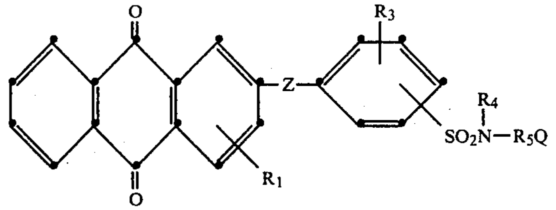

| Ex. | $-SO_2-$ Position | $R_1$ | Z | $R_3$ | $R_4$ | $R_5Q$ |
|---|---|---|---|---|---|---|
| 110 | 3 | " | $COCH_3$<br>$-OCH_2CH_2NCH_2CH_2O-$ | H | H | 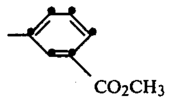 |
| 111 | 3 | $1-NH_2-4-NHC_6H_5$ | $-O-$ | H | H | $CH_2CH_2OH$ |
| 112 | 3 | $1-NH_2-4-SC_4H_9-n$ | " | " | " | 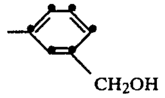 |
| 113 | 3 | $1-NH_2-4-SCH_2CH_2OH$ | " | " | " | 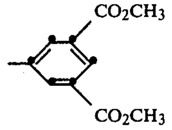 |
| 114 | 3 | $1-NH_2-4-OH$ | $-SCH_2CH_2S-$ | " | " | $-CH_2CH_2OH$ |
| 115 | 3 | $1-NH_2$ | $-SCH_2CH_2SCH_2-$ | $4-CH_3$ | " | " |

EXAMPLE 116

A polyester containing one of the above copolymerized red dyes was prepared as follows: 145.5 grams (0.75 moles) of dimethyl terephthalate, 85.0 grams (1.44 moles) of ethylene glycol, 100.0 ppm of Ti catalyst, and 100.0 ppm of the red dye of Example 7 above were added to a 500 ml round-bottom flask fitted with a stirrer, condensate take-off, and nitrogen inlet head. The flask and contents were immersed into a Wood's metal bath at approximately 170° C. The temperature was raised to 195° C. and maintained for two hours and 20 minutes while ester exchange took place between DMT, ethylene glycol, and the dye. It is noted that in those cases where the active groups on the colorant are carboxyl, esterification would occur between the dye and ethylene glycol to build the dye into the polymer chain. The temperature was then raised to 285° C. During all of the above reactions, a nitrogen purge of approximately 2 cubic feet per hour was maintained over the reactants. At 285° C., the melt was placed under 0.10 mm vacuum and polymerization was continued for 25 minutes. The resulting polymer was a brilliant red and had an inherent viscosity of 0.58 in phenol/tetrachloroethane. There was no evidence of color change or sublimation of the dye from the polymer during the above preparation.

Such polymers may be prepared by the above procedure or others well known to the polyester manufacturing art using combinations of red, blue, and yellow dyes to produce, for example, amber colored polymers useful for molding beverage bottles. The types of polyesters in which the present colorants may be incorporated include those from monomers such as disclosed in U.S. Pat. Nos. 2,465,319, 3,668,277, 3,560,445 and Br. 578,079. Exemplary are those produced from one or more diols such as 1,4-bis(hydroxymethyl)cyclohexane; ethylene glycol; 1,2-propanediol; 1,3-propanediol, 1,2-butanediol, 2,3-butanediol; 1,3-butanediol; 1,4-butanediol; 2,2-dimethyl-1,3-propanediol; 2,3-propanediol; 1,6-hexanediol; 2-ethylhexanediol; 1,2-cyclohexanediol; 1,4-cyclohexanediol; 1,2-bis(hydroxymethyl)cyclohexane; 1,3-bis(hydroxymethyl)-cyclohexane; x,8-bis(hydroxymethyl)tricyclo[5.2.1.0]-decane wherein x represents 3, 4 or 5; and diols containing one or more oxygen atoms in the chain, e.g., diethylene glycol, triethylene glycol, dipropylene glycol or tripropylene glycol. In general, useful diols contain 2 to 18, preferably 2 to 12 carbon atoms. Cycloaliphatic diols can be employed in their cis or trans configuration or as a mixture of both forms.

Useful acids include both cyclic and acyclic dicarboxylic acids. The term "acid" as used herein to define a reactant includes its anhydride or other reactive species such as esters or the like. Examples of suitable aromatic and cycloaliphatic dicarboxylic acids are terephthalic, isophthalic, hexahydroterephthalic, tetrahydrophthalic, hexahydrophthalic, hexahydroisophthalic, endomethylene and endoethylenetetrahydrophthalic, hexachloroendomethylenetetrahydrophthalic and tetrabromophthalic. The cycloaliphatic dicarboxylic acids can be employed in their trans or cis configuration or as a mixture of both forms. The dicarboxylic acids wherein the carboxyl groups are arranged in the 1,2- or 1,3-position are preferred, with 1,2- being especially preferred. Of these, phthalic acid and hexahydrophthalic acid are especially preferred. In general, the cyclic dicarboxylic acids contain eight to 12 carbon atoms, preferably eight to 10 carbon atoms. The carbocyclic dicarboxylic acids are preferred, especially the monocarbocyclic, e.g., wherein the ring is a benzene, cyclohexane or bridged cyclohexane ring. Also useful, for example, are succinic, glutaric, adipic, suberic, sebacic, decanedicarboxylic, 2,2,4-trimethyladipic, maleic, fumaric, itaconic and citraconic acids. In place of the cyclic and/or acyclic dicarboxylic acids themselves, it is often preferable to use a functional derivative thereof such as esters from lower-alkanols, e.g., the dimethyl, diethyl or dipropyl ester. The anhydrides can likewise be employed, e.g., phthalic anhydride, hexahydrophthalic anhydride, tetrahydrophthalic anhydride, succinic anhydride, glutaric anhydride and maleic anhydride.

The polyesters can be produced according to conventional processes, e.g., preferably with a catalyst, with or without the introduction of an inert gas stream, as solution condensation in a solvent, as a melt condensation or azeotropic esterification, at temperatures of up to about 250° C., or higher so that the water or alkanol produced by the esterification is continuously removed. The esterification takes place almost quantitatively and can be followed by measuring the hydroxyl and acid numbers. The esterification temperature may be selected so that the losses of readily volatile substances remain small, i.e., during at least the first period of the esterification, the process is conducted at a temperature below the boiling point of the lowest-boiling starting material.

With regard to the unsaturated, curable polyesters useful herein, these are the polyesterification products of one or more dihydric alcohols and one or more unsaturated dicarboxylic acids or their anhydrides, and the term "polyester resin" is used herein to denote the unsaturated polyester dissolved in, or cross-linked with, an ethylenically unsaturated monomer. Typical is the polyesterification product of (a) 1,4-cyclohexanedimethanol and/or 2,2-dimethyl-1,3-propanediol and optionally an additional dihydric alcohol, such as ethylene glycol, and (b) maleic acid or fumaric acid or the anhydride of maleic acid, and an aromatic dicarboxylic acid, which product when crosslinked with an ethylenically unsaturated monomer, e.g. styrene, produces a polyester resin which has, for example, high thermal resistance, high heat distortion values, excellent electrical and mechanical properties and excellent resistance to chemicals.

The unsaturated polyesters may be prepared in the presence of gelation inhibitors such as hydroquinone or the like, which are well known in the art of polyesterification. The esterification may be carried out for example under an inert blanket of gas such as nitrogen in a temperature range of 118°-220° C. for a period of about 6-20 hours until an acid number below 100 and preferably below 50 is obtained, based on milliequivalents of KOH necessary to neutralize one gram of the polyester. The resulting polyesters may be dissolved in and subsequently copolymerized with any of the well-known ethylenically unsaturated monomers used as solvents and copolymerizable monomers for polyesters. Examples of such monomers include styrene, alpha-methyl styrene, vinyl toluene, divinyl benzene, chlorostyrene, and the like as well as mixtures thereof.

Preferred unsaturated polyesters are prepared from one or more dihydric alcohols, fumaric or maleic acid or anhydride, and up to about 60 mole percent of total acid component of o-phthalic, isophthalic or terephthalic acids or anhydrides. Preferred for the dihydric alcohol component is one or more of propylene glycol, neopentyl glycol, 2,2,4-trimethyl-1,3-pentanediol, ethylene glycol, and diethylene glycol. A most preferred unsaturated polyester is prepared from propylene glycol, and o-phthalic anhydride and maleic anhydride in a mole ratio of from about 1/2 to about 2/1.

The present anthraquinone dye colorants are present in coloring amounts, i.e., from about 1.0 part per million parts of the polyester (ppm) to about 3.0% by weight thereof, and preferably from about 2.0 to about 2500 parts per million parts of the polyester. Preferred polyesters for bottle molding are the linear thermoplastic polyesters having an I.V. of from about 0.4 to about 0.8, the acid moiety of which comprises at least about 50 mole percent terephthalic acid residue, and the glycol moiety of which comprises at least about 50 mole percent ethylene glycol or 1,4-cyclohexanedimethanol residue, and containing from about 2.0 to about 1500 parts per million of one or more of the above copolymerized dyes.

An especially preferred polyester is prepared from dimethyl terephthalate, ethylene glycol which may contain up to about 5 mole % of 1,4-cyclohexanedimethanol based on total moles of glycol, and containing from about 2.0 to about 1500 parts of one or more of the above copolymerized dyes per one million parts of polyester.

The invention has been described in detail with particular reference to preferred embodiments thereof, but it will be understood that variations and modifications can be effected within the spirit and scope of the invention.

We claim:

1. A colored polyester composition comprising a linear thermoplastic, or unsaturated cross-linkable polyester containing a coloring amount of one or more copolymerized dyes of the formula

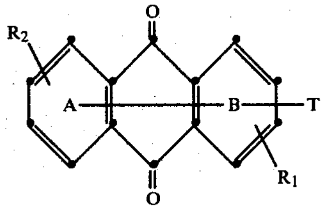

wherein $R_1$ and $R_2$ each represents hydrogen or 1-3 substituents depending on the number of T substituents present, and independently selected from alkyl, alkoxy, alkylamino, alkylsulfonyl, alkylsulfonylamino, alkanoylamino, aroylamino, alkylthio, arylamino, amino, cycloalkylamino, alkanoyl, aroyl, arylsulfonyl, $CF_3$, arylsulfamoyl, cyano, halogen, hydroxy, nitro, sulfamoyl, alkylsulfamoyl, dialkylsulfamoyl, carbamoyl, alkylcarbamoyl and dialkylcarbamoyl; and T is 1-4 independently selected substituents of the formula

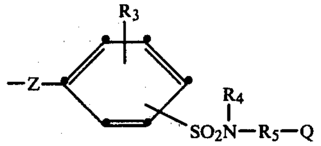

in any positions on rings A and/or B, wherein each Z is a divalent linking group independently selected from —NH—, —S—, —O—, —NHR—, —SR—, —SRS—, —SRO—, —SRSR—, —NHRO—, —NHRORO—, —NHRS—, —NHRSR—, —NHRN(COR)—, —NHRN($SO_2R$)—, —ORO—, —OR—, —OROR—, —ORORO—, —ORSR—, and —ORN(COR)RO—, wherein R is alkylene, arylene or cycloalkylene;

$R_3$ represents hydrogen or 1-3 substituents independently selected from alkyl, alkoxy, cyano, alkanoylamino, halogen, and alkylthio; each $R_4$ is independently selected from hydrogen, alkyl, cycloalkyl, and aryl; each $R_5$ is independently selected from alkylene, arylene, cycloalkylene, aryleneaikylene, aryleneoxyalkylene, arylenethioalkylene, alkylenethioalkylene, alkyleneoxyalkylene, arylenedialkylene, and cyclohexylenedialkylene; each Q represents 1-3 groups independently selected from hydroxy, carboxy, —COO—alkyl, —COO—aryl, and —COO—cycloalkyl;

and wherein the alkyl, alkylene, cycloalkyl, cycloalkylene, aryl, and arylene moieties or segments of the above $R_1$-$R_5$ groups are unsubstituted or substituted with 1-3 of the following: hydroxy; halogen; cyano; amino; alkoxy; alkoxycarbonyl; aroyloxy; alkoxyalkoxy; hydroxyalkoxy; succinimido; glutarimido; phthalimido; phthalimidino; 2-pyrrolidono; cyclohexyl; phenoxy; phenyl; phenyl substituted with alkyl, alkoxy, alkoxycarbonyl, halogen, alkanoylamino or cyano; acrylamido; alkenyl; benzoylsulfonicimido; groups of the formula

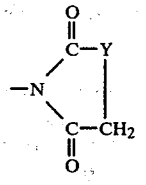

wherein Y is —NH—, $-\overset{|}{N}-$alkyl,

—O—, —S—, >CHOH, or —$CH_2$—O—; —S—$R^6$ wherein $R^6$ is selected from alkyl, alkyl substituted with 1-3 of halogen, hydroxy, phenoxy, aryl, cyano, cycloalkyl, alkylsulfonyl, alkylthio, alkanoyloxy, or alkoxy, phenyl, phenyl substituted with one or more of halogen, alkyl, alkoxy, alkanoylamino, cyano or alkoxycarbonyl, pyridyl, pyrimidinyl, 2-benzoxazolyl, 2-benzimidazolyl, 2-benzothiazolyl or

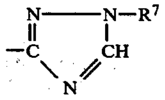 ;

—$SO_2R^8$; —$COOR^8$; —$OXR^8$; —NH—X—$R^8$; —$CONR^7R^7$; —$SO_2NR^7R^7$; wherein X is —CO—, —COO—, or —$SO_2$; $R^8$ is selected from alkyl, aryl, cycloalkyl, and each of these groups substituted as appropriate with 1-3 substituents independently selected from halogen, hydroxy, phenoxy, aryl, alkyl, cyano, cycloalkyl, alkylsulfonyl, alkylthio, alkanoyloxy, and alkoxy, and when X is —CO—, $R^8$ is further selected from hydrogen, amino, alkenyl, alkylamino, dialkylamino, arylamino and furyl; $R^7$ is selected from hydrogen, alkyl, aryl, alkoxysubstituted aryl, cycloalkyl, amino, alkylamino, dialkylamino, arylamino, furyl, and alkyl substituted with 1-3 of halogen, hydroxy, phenoxy, aryl, cyano, cycloalkyl, alkylsulfonyl, alkylthio, alkanoyloxy, or alkoxy; alkoxy substituted with 1-3 of hydroxy, cyano or alkanoyloxy; alkoxyalkoxy substituted with 1-3 of hydroxy, cyano, alkanoyloxy or alkoxy; and phenoxy substituted with 1-3 of alkyl, alkoxy or halogen.

2. The composition of claim 1 wherein each of $R_1$ and $R_2$, in addition to H, represents 1-3 substituents independently selected from halogen, —OH, —CN, —$NH_2$, —$NO_2$, alkyl, alkyl substituted with 1-3 of phenoxy, acetoxy, halogen, or alkoxy, benzoyl, alkoxy, hydroxyalkoxy, alkanoyl, carbamoyl, alkylcarbamoyl, dialkylcarbamoyl, phenylsulfonyl, alkylsulfonyl, hydroxyalkylsulfonyl, sulfamoyl, alkylsulfamoyl, dialkylsulfamoyl, hydroxyalkylsulfamoyl, alkylthio, hydroxyalkylthio, aralkylamino, alkylamino, cyclohexylamino, acetamido, phenylsulfonamido, and alkylsulfonamido; $R_3$, in addition to H, represents 1-3 substituents independently selected from alkyl, alkoxy, haloalkyl, halogen, alkylthio, —CN, and alkanoylamino; $R_4$, in addition to H, is a group selected from alkyl, phenyl, cyclohexyl, hydroxyalkyl, and benzyl; and $R_5$ is a radical selected from alkylene, phenyl substituted alkylene, alkyleneoxyalkylene, alkylenethioalkylene, alkylenearylene, alkylenecyclohexylene, alkylenecyclohexylenealkylene, alkyleneoxyarylene, alkyleneoxycarbonylarylene, alkylenethioarylene, arylene, and cyclohexylene, wherein the rings are unsubstituted or substituted with 1-3 groups independently selected from halogen, alkyl, and alkoxy.

3. The composition of claim 2 wherein for the $R_1$ through $R_5$ groups: the alkyl and alkylene moieties thereof are unsubstituted or substituted with 1-3 of phenyl, phenoxy, hydroxy, alkanoyloxy, F, Cl, Br, I, or alkoxy; the cycloalkyl and cycloalkylene moieties thereof are unsubstituted or substituted with 1-3 of alkyl or hydroxy; and the aryl and arylene moieties thereof are unsubstituted or substituted with 1-3 of alkyl, F, Cl, Br, I, alkoxy or hydroxy.

4. The composition of claim 1 wherein the dye component is present in a concentration of from about 1.0 ppm to about 3.0 percent by weight of the polyester, and comprises one or more of the dyes of the formula

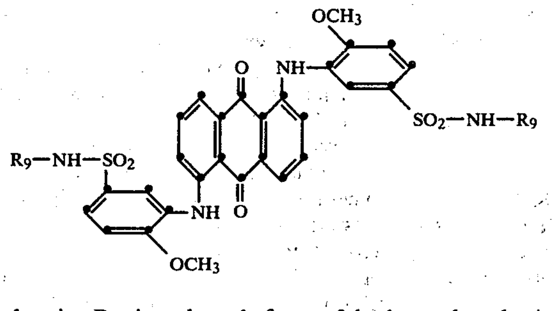

wherein $R_9$ is selected from: 3-hydroxyphenyl; 4-hydroxyphenyl; 4-(2-hydroxyethyl)-phenyl; 3-methoxycarbonylphenyl; and 2-hydroxyethyl.

5. The composition of claim 1 wherein the polyester is prepared from dimethyl terephthalate and a diol component comprising ethylene glycol and, based on total moles of diol, from 0 to about 30 mole % of 1,4-cyclohexanedimethanol, and up to about 5 mole % of diethylene glycol, each dye is present in reacted form in a concentration of from about 2.0 to about 1500 ppm and wherein from about 5 to about 200 ppm of copper phthalocyanine is admixed therewith.

6. The composition of claim 1 wherein the polyester is unsaturated and is prepared from one or more diols, fumaric or maleic acid, and up to about 60 mole percent of total acid component of one or a mixture of o-phthalic, isophthalic, and terephthalic acids, and wherein each dye is present in reacted form in a concentration of from about 2.0 to about 1500 ppm.

7. The composition of claim 2 wherein the diol component comprises one or more of propylene glycol, neopentyl glycol, 2,2,4-trimethyl-1,3-pentanediol, ethylene glycol, and diethylene glycol.

8. The composition of claim 3 wherein the diol is propylene glycol and the acid component comprises in a mole ratio of from about 1/2 to about 2/1 o-phthalic anhydride and maleic anhydride.

9. The composition of claim 2, wherein the polyester is prepared from dimethyl terephthalate and a diol component comprising ethylene glycol and, based on total moles of diol, from 0 to about 30 mole % of 1,4-cyclohexanedimethanol, and up to about 5 mole % of diethylene glycol, each dye is present in reacted form in a concentration of from about 2 to about 1500 ppm and wherein from about 5 to about 200 ppm of copper phthalocyanine is admixed therewith.

* * * * *